US012555886B2

(12) United States Patent
Hill et al.

(10) Patent No.: US 12,555,886 B2
(45) Date of Patent: Feb. 17, 2026

(54) MOBILE RADIO STATION (71) Applicant: Critical Infrastructure Technologies Pty Ltd, Fremantle (AU)

(72) Inventors: Andrew Hill, North Fremantle (AU); John Jacob, Spearwood (AU)

(73) Assignee: Critical Infrastructure Technologies Pty Ltd, Fremantle (AU)

( * ) Notice: Subject to any disclaimer, the term of this patent is extended or adjusted under 35 U.S.C. 154(b) by 129 days.

(21) Appl. No.: 18/558,043

(22) PCT Filed: Apr. 27, 2022

(86) PCT No.: PCT/AU2022/050389
§ 371 (c)(1),
(2) Date: Oct. 30, 2023

(87) PCT Pub. No.: WO2022/226593
PCT Pub. Date: Nov. 3, 2022

(65) Prior Publication Data
US 2024/0204388 A1    Jun. 20, 2024

(30) Foreign Application Priority Data
Apr. 30, 2021  (AU) .............................. 2021901291

(51) Int. Cl.
*H01Q 1/12* (2006.01)
*B66F 7/06* (2006.01)
(Continued)

(52) U.S. Cl.
CPC ......... *H01Q 1/1235* (2013.01); *B66F 7/0666* (2013.01); *H01Q 1/084* (2013.01);
(Continued)

(58) Field of Classification Search
CPC .... B66F 7/0666; H01Q 1/084; H01Q 1/1235; H01Q 1/3216; H02S 20/30; H02S 30/20;
(Continued)

(56) References Cited

U.S. PATENT DOCUMENTS 3,350,065 A * 10/1967 Mankey .................... B66F 3/22
187/269
5,531,419 A *  7/1996 Gustafsson .......... H01Q 1/1235
343/882
(Continued)

FOREIGN PATENT DOCUMENTS

CN    208749211 U    4/2019
CN    111757193 A    10/2020
(Continued)

OTHER PUBLICATIONS

International-Type Search Report completed Mar. 22, 2022 for Australian application No. 2021901291.
(Continued)

*Primary Examiner* — Thien M Le
(74) *Attorney, Agent, or Firm* — Husch Blackwell LLP (57) ABSTRACT

A mobile radio station includes a frame, a tower with an antenna, a scissor lift to dispose the tower in a stowed configuration and a deployed configuration; and a tower deployment mechanism. Scissor lift stages are connected with interstage joints, each having a first joint member with a first contact portion, a second joint member with a second contact portion, and a joint pivot connection for relative angular movement therebetween. The first joint member rotates relative to the second joint member about the joint pivot connection until the first contact portion contacts the second contact portion during movement of the tower. Further relative rotational of the joint members causes pivotal movement of the first joint member relative to the second joint member and movement of the interstage joint to
(Continued)

a rigid configuration wherein rigidity of the interstage joint is increased.

20 Claims, 9 Drawing Sheets

(51) Int. Cl.
    *H01Q 1/08* (2006.01)
    *H02S 20/30* (2014.01)
    *H02S 30/20* (2014.01)
    *H04W 88/08* (2009.01)

(52) U.S. Cl.
    CPC .............. *H02S 20/30* (2014.12); *H02S 30/20* (2014.12); *H04W 88/085* (2013.01)

(58) Field of Classification Search
    CPC ............... H04W 88/085; H04W 4/021; F16M 2200/061; F16M 2200/08
    See application file for complete search history.

(56) References Cited

U.S. PATENT DOCUMENTS

| | | | |
|---|---|---|---|
| 6,131,291 A * | 10/2000 | Mock | B26B 13/28 |
| | | | 411/259 |
| 8,172,255 B1 * | 5/2012 | Martin | B62B 3/04 |
| | | | 187/244 |
| 9,193,573 B1 * | 11/2015 | Troy | B66F 7/065 |
| 2003/0182912 A1 * | 10/2003 | Boll | A01D 34/661 |
| | | | 56/14.7 |
| 2011/0146751 A1 | 6/2011 | Mcguire | |
| 2014/0116234 A1 | 5/2014 | Jacq | |
| 2017/0015509 A1 * | 1/2017 | Stoloff | B65G 65/23 |
| 2018/0036879 A1 * | 2/2018 | Buibas | B25J 19/023 |
| 2018/0062239 A1 * | 3/2018 | McCoy | H01Q 1/3216 |
| 2019/0326846 A1 | 10/2019 | Ansari et al. | |
| 2022/0136432 A1 * | 5/2022 | Makartchouk | F02B 75/32 |
| | | | 123/197.4 |
| 2025/0009574 A1 * | 1/2025 | Lee | A61G 3/02 |

FOREIGN PATENT DOCUMENTS

| | | |
|---|---|---|
| KR | 101402113 B1 | 6/2014 |
| KR | 101962399 B1 | 3/2019 |
| WO | 2020178103 A1 | 9/2020 |

OTHER PUBLICATIONS

Machine translation of KR101962399.
Machine translation of WO2020178103.
Machine translation of CN111757193.
Machine translation of KR101402113.
International Search Report mailed Jun. 27, 2022 for international patent appl. no. PCT/AU2022/050389.
Extended European Search Report issued on Mar. 10, 2025 in European Application No. 22794100.2.

* cited by examiner

MOBILE RADIO STATION

CROSS REFERENCES

This application is a U.S. National Phase Application of International Application No. PCT/AU2022/050389 filed on 27 Apr. 2022, which claims priority to Australian Application No. 2021901291 filed on 30 Apr. 2021, the disclosures of each of which are hereby incorporated by reference herein in their entireties.

TECHNICAL FIELD

The present disclosure relates to a mobile radio station that facilitates radio communications, particularly in remote environments.

BACKGROUND

Mobile radio stations that support LTE and networking capabilities are known. However, existing mobile radio stations tend to provide short range, relatively low capacity capabilities and relatively low reliability which in some applications is insufficient, for example on a remote mine site.

SUMMARY

In accordance with a first aspect of the present disclosure, there is provided a mobile radio station comprising: a frame portion; a communications tower having at least one communications antenna and a scissor lift mechanism usable to dispose the communications tower in a stowed configuration wherein the communications tower is disposed in the frame portion, and a deployed configuration wherein the communications tower extends out of the frame portion and disposes the at least one antenna upwardly of the frame portion; and a tower deployment mechanism usable to control movement of the scissor lift mechanism and thereby movement of the communications tower between the stowed configuration and the deployed configuration; the scissor lift mechanism including at least 2 scissor lift stages movably connected together using a plurality of interstage joints, each interstage joint including a first joint member having a first contact portion, a second joint member having a second contact portion and a joint pivot connection that facilitates relative angular movement between the first and second joint members; the first joint member connected to a first scissor lift stage and the second joint member connected to an adjacent second scissor lift stage such that as the communications tower moves from the stowed configuration to the deployed configuration, the first joint member rotates relative to the second joint member about the joint pivot connection until the first contact portion contacts the second contact portion at a point of contact; wherein further rotational movement of the first joint member relative to the second joint member about the joint pivot connection causes pivotal movement of the first joint member relative to the second joint member about the point of contact and movement of the interstage joint to a rigid configuration wherein rigidity of the interstage joint is increased.

In an embodiment, the scissor lift mechanism comprises a plurality of aligned scissor lift components, such as 2 aligned scissor lift components.

In an embodiment, the scissor lift mechanism is arranged to cause interstage joints disposed between different scissor lift stages to move to the rigid configuration in sequence.

In an embodiment, the sequence is such that interstage joints disposed relatively remote from a lowermost end of the communications tower move to the rigid configuration before interstage joints disposed relatively adjacent the lowermost end of the communications tower In an embodiment, the scissor lift mechanism is configured to dispose the at least one communications antenna at a height of about 15 m when the communications tower is in the deployed configuration. In an embodiment, the communications tower is disposable in a partially deployed configuration wherein the communications tower extends out of the frame portion and disposes the at least one antenna upwardly of the frame portion at a height less than the height of the at least one antenna when the communications tower is in the deployed configuration.

In an embodiment, the scissor lift mechanism comprises at least 2 lower end portions remote from the at least one antenna, and the tower deployment mechanism is arranged to control movement of at least one end portion towards and away from the other end portion and thereby movement of the scissor lift mechanism between a stowed configuration and deployed configuration. In an embodiment, the tower deployment mechanism includes at least one tower ram connected between a lower end portion and the frame portion, the at least one tower ram facilitating controlled slidable movement of the at least one lower end portion and thereby movement of the scissor lift mechanism between a stowed configuration and deployed configuration.

In an embodiment, the tower deployment mechanism includes 2 tower rams, each tower ram connected to a respective lower end portion of the scissor lift mechanism. The or each tower ram may be a hydraulic ram.

In an alternative embodiment, the tower deployment mechanism includes a tower deployment lead screw arrangement.

In an embodiment, the mobile radio station comprises a plurality of legs, each leg disposable in a stowed configuration wherein the leg is disposed adjacent the frame portion and a deployed configuration wherein a free end of the leg is disposed remotely relative to the frame portion and in contact with the ground. In an embodiment, when each leg is disposed in the deployed configuration, the horizontal distance between the frame portion and the free end of each leg is about 2.4 m.

In an embodiment, each leg comprises a first elongate leg portion connected at a first end to the frame portion at a frame pivot connection and connected at a second opposite end to a first end of a second elongate leg portion at an elbow pivot connection. A second opposite end of the second leg portion may be connected to a ground engaging foot at a foot pivot connection.

In an embodiment, the mobile radio station comprises a leg deployment mechanism to control movement of the legs between the stowed configuration and the deployed configuration by controlling rotation of the first elongate leg portion about the frame portion pivot connection, and controlling rotation of the second elongate leg portion about the elbow pivot connection.

In an embodiment, the leg deployment mechanism comprises for each leg a first leg ram connected between the frame portion and the first leg portion, and a second leg ram connected between the first leg portion and the second leg.

In an embodiment, the mobile radio station comprises a level determiner arranged to determine the orientation of the frame portion and produce signals indicative of the orientation of the frame portion, the orientation signals used to control the leg deployment mechanism so that the legs dispose the frame portion in a substantially level orientation when deployed.

In an embodiment, the leg deployment mechanism is arranged to control movement of the legs to and from a loading/unloading configuration wherein the frame portion is raised by the legs relative to the ground such that a bed of a truck is disposable under or removable from under the frame portion.

In an embodiment, the mobile radio station comprises a solar cell device disposable in a stowed configuration wherein the solar cell device serves as a top panel of the frame portion and the communications tower cannot move from the stowed configuration to the deployed configuration, and a deployed configuration wherein the solar cell device is disposed adjacent a side of the frame portion and the communications tower is able to move from the stowed configuration to the deployed configuration.

In an embodiment, the mobile radio station comprises a solar cell device deployment mechanism arranged to control movement of the solar cell device between the stowed configuration n and the deployed configuration. In an embodiment, the solar cell device deployment mechanism includes at least one solar cell device ram. The solar cell device deployment mechanism may also include a motor that may be a DC stepper motor.

In an alternative embodiment, the solar cell deployment mechanism includes a solar cell deployment lead screw arrangement.

In an embodiment, the solar cell device deployment mechanism includes a guide pin and corresponding guide channel so that a linear component of movement of the solar cell device follows a defined path. The solar cell device ram may be a hydraulic ram.

In an embodiment, the solar cell device includes a first solar panel and a second solar panel, the second solar panel reciprocably movable relative to the first solar panel such that the solar panels are disposable in a contracted configuration and an expanded configuration.

In an embodiment, the mobile radio station comprises a power storage device that may include at least one rechargeable battery for receiving and storing electrical power from the solar cell device. In an embodiment, the mobile radio station comprises a remote control unit usable to control at least one component of the mobile radio station, and the frame portion includes an externally disposed lockable compartment for storing the remote control.

In an embodiment, the mobile radio station includes a communications system arranged to facilitate and control communications using the communications tower, the communications system disposed in the frame portion.

In an embodiment, the mobile radio station includes at least one generator arranged to generate electrical power for components of the mobile radio station, the at least one generator disposed in the frame portion. The or each generator may be arranged to produce DC electricity. In an embodiment, the or each generator includes an AC interface arranged to receive external AC electricity and convert the received AC electricity to DC electricity for use by components of the mobile radio station.

In an embodiment, the at least one generator includes a primary generator and a secondary generator, the mobile radio station arranged to activate the secondary generator when the primary generator is not operational.

In an embodiment, the mobile radio station is arranged to supply electrical power to components of the mobile radio station from the power storage device, and to activate a generator to supply electrical power to the components of the mobile radio station if the power storage device has insufficient electrical power is available.

In an embodiment, the mobile radio station includes at least one air conditioning system, the at least one air conditioning system disposed in the frame portion.

In an embodiment, the at least one air conditioning system includes a primary air conditioning system and a secondary air conditioning system, the mobile radio station arranged to activate the secondary air conditioning system when the primary air conditioning system is not operational.

The or each air conditioning system may comprise a heating, ventilating and air conditioning (HVAC) system.

In an embodiment, the frame portion forms part of a container.

These and other aspects are merely illustrative of the innumerable aspects associated with the present disclosure and should not be deemed as limiting in any manner. These and other aspects, features, and advantages of the present disclosure will become apparent from the following detailed description when taken in conjunction with the referenced drawings.

BRIEF DESCRIPTION OF THE DRAWINGS

Reference is now made more particularly to the drawings, which illustrate the best presently known mode of carrying out the present disclosure and wherein similar reference characters indicate the same parts throughout the views.

DETAILED DESCRIPTION

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. The following definitions and non-limiting guidelines must be considered in reviewing the description of the technology set forth herein.

In the following detailed description numerous specific details are set forth in order to provide a thorough understanding of the present disclosure. However, it will be understood by those skilled in the art that the present disclosure may be practiced without these specific details. For example, the present disclosure is not limited in scope to the particular type of industry application depicted in the figures. In other instances, well-known methods, procedures, and components have not been described in detail so as not to obscure the present disclosure.

The headings and sub-headings used herein are intended only for general organization of topics within the present disclosure and are not intended to limit the disclosure of the technology or any aspect thereof. In particular, subject matter disclosed in the "Background" may include novel technology and may not constitute a recitation of prior art. Subject matter disclosed in the "Summary" is not an exhaustive or complete disclosure of the entire scope of the technology or any embodiments thereof. Classification or discussion of a material within a section of this specification as having a particular utility is made for convenience, and no inference should be drawn that the material must necessarily or solely function in accordance with its classification herein when it is used in any given composition.

The citation of references herein does not constitute an admission that those references are prior art or have any relevance to the patentability of the technology disclosed herein. All references cited in the "Detailed Description" section of this specification are hereby incorporated by reference in their entirety.

Figures 1, 2:
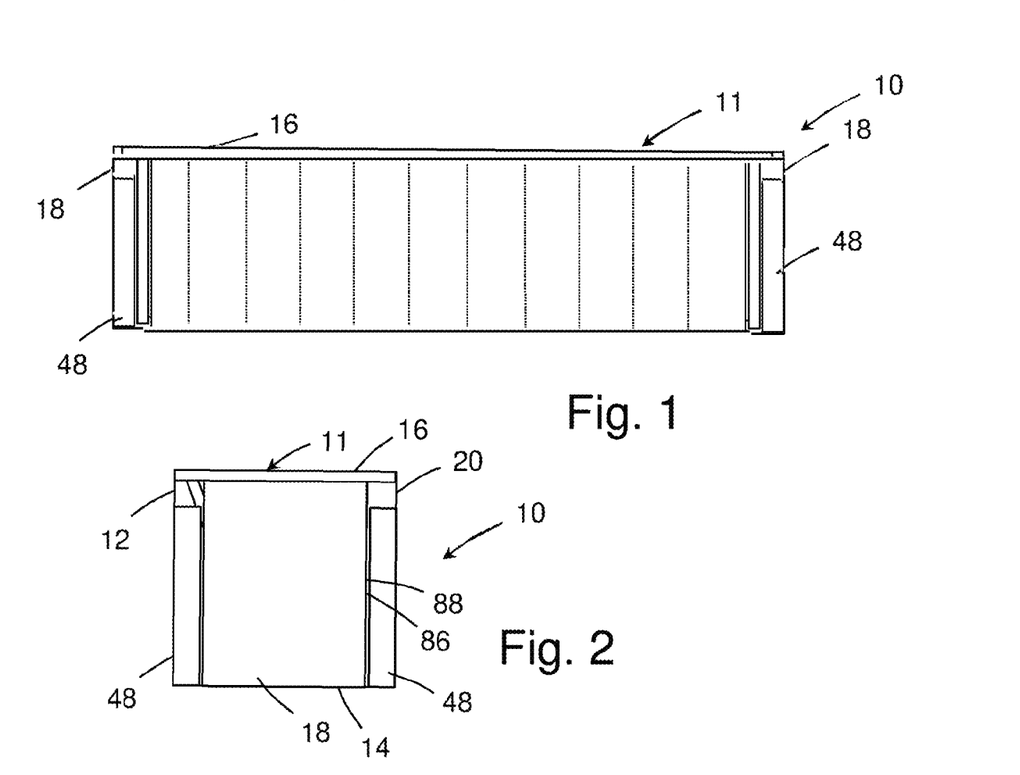
FIG. 1 is a diagrammatic side view of a mobile radio station in accordance with an embodiment of the present disclosure.
FIG. 2 is a diagrammatic end view of the mobile radio station shown in FIG. 1.

Referring to the drawings, FIGS. 1 and 2 show side and end views of a mobile radio station 10 that in this example is incorporated into a frame portion of dimensions similar to the dimensions of a shipping container, for example 6.058 m×2.438 m×2.896 m.

In this embodiment, the frame portion forms part of a container 11, such as a shipping container, that has a front panel 12, a floor panel 14, a top panel 16, end panels 18 and a rear panel 20, as shown in FIGS. 1 and 2.

Figure 3:
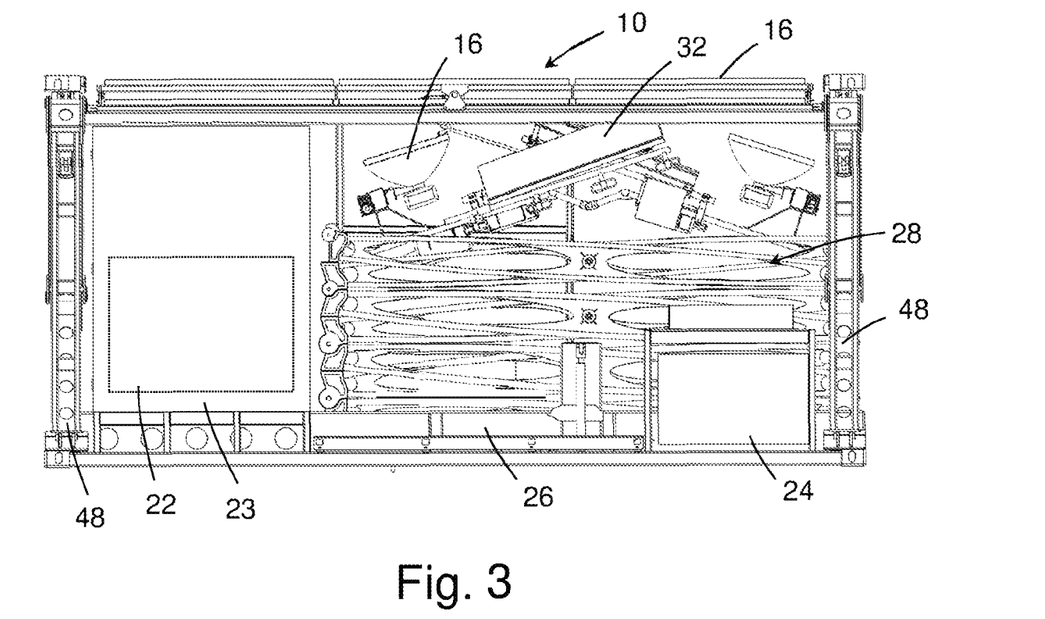
FIG. 3 is a diagrammatic side view of a mobile radio station in accordance with an embodiment of the present disclosure.
Figure 4:
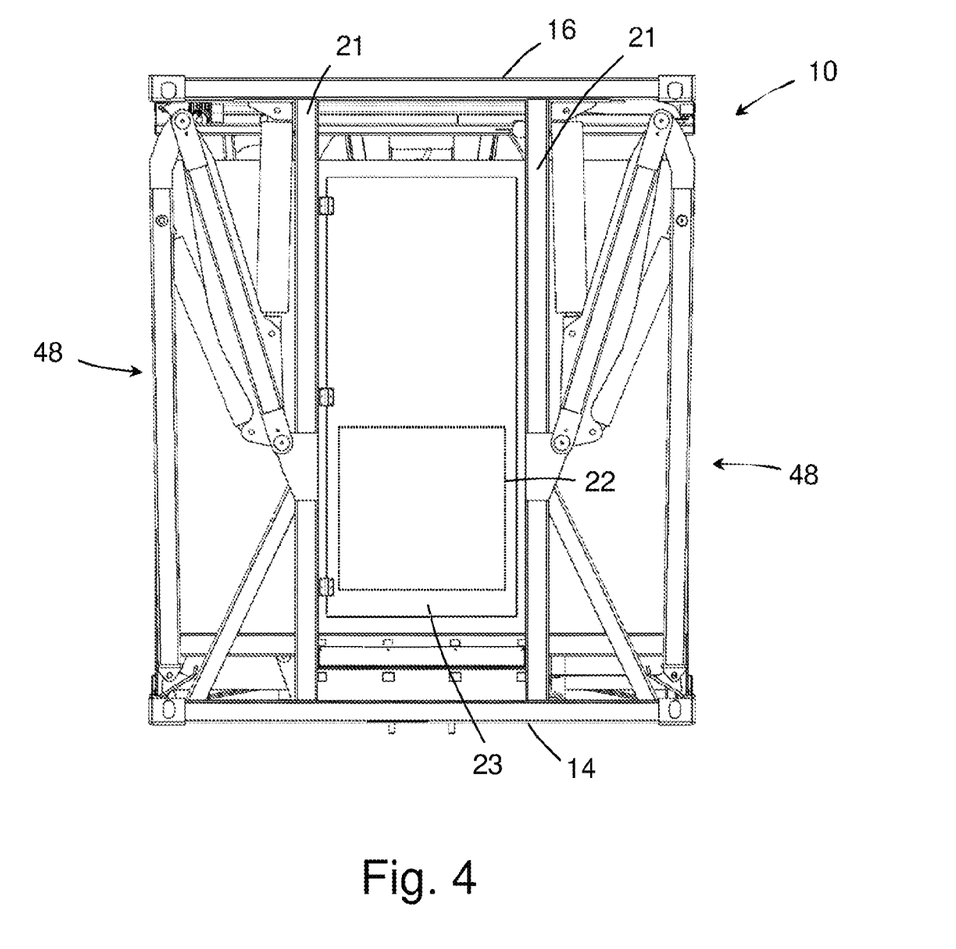
FIG. 4 is a diagrammatic end view of the mobile radio station shown in FIG. 3.
Figure 5:
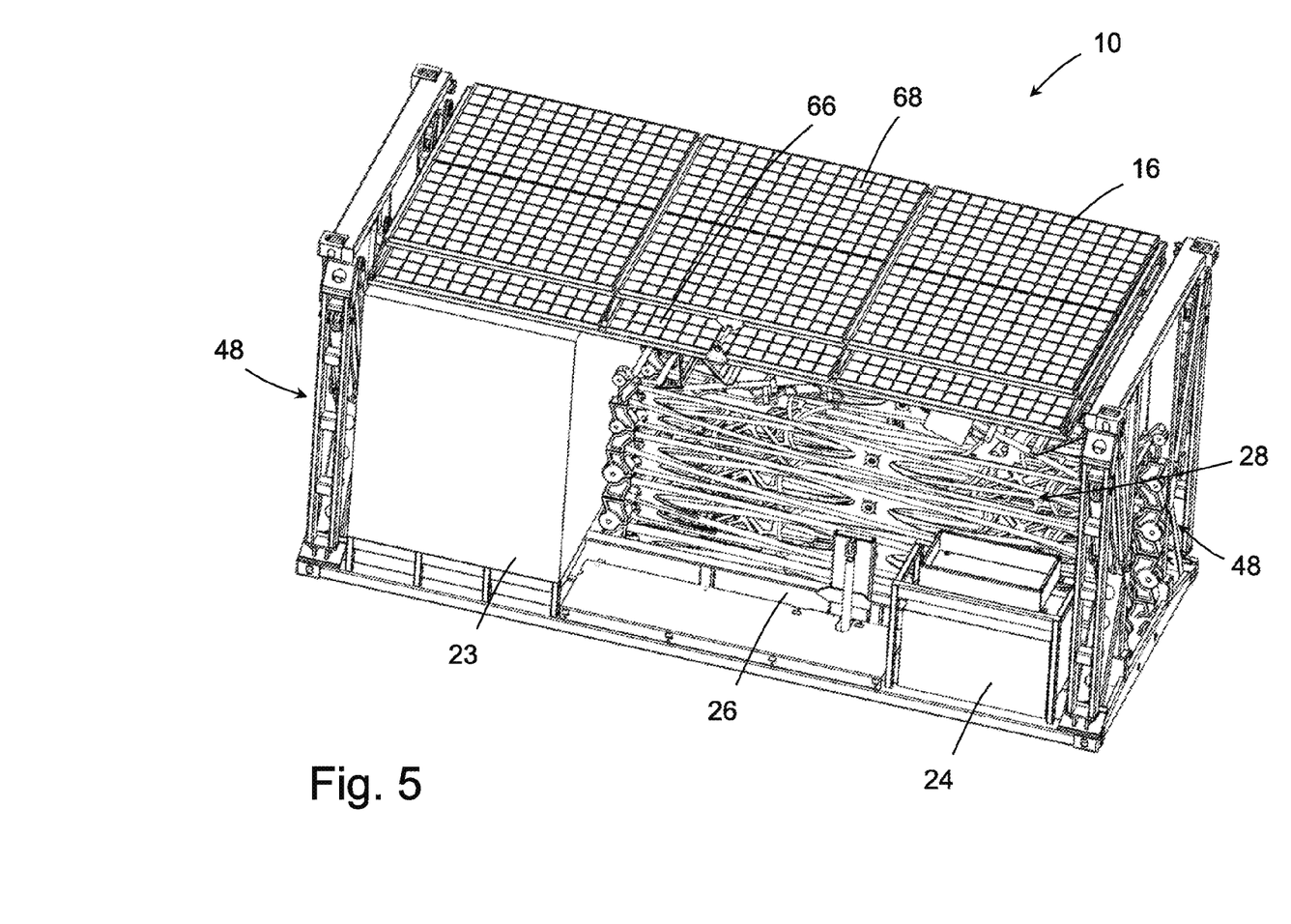
FIG. 5 is a diagrammatic perspective view of the mobile radio station shown in FIGS. 3 and 4.

In an alternative embodiment, the frame portion includes a floor panel 14, a top panel 16 and connecting struts 21, but does not include side and end panels, as shown in FIGS. 3 to 5.

Figure 8:
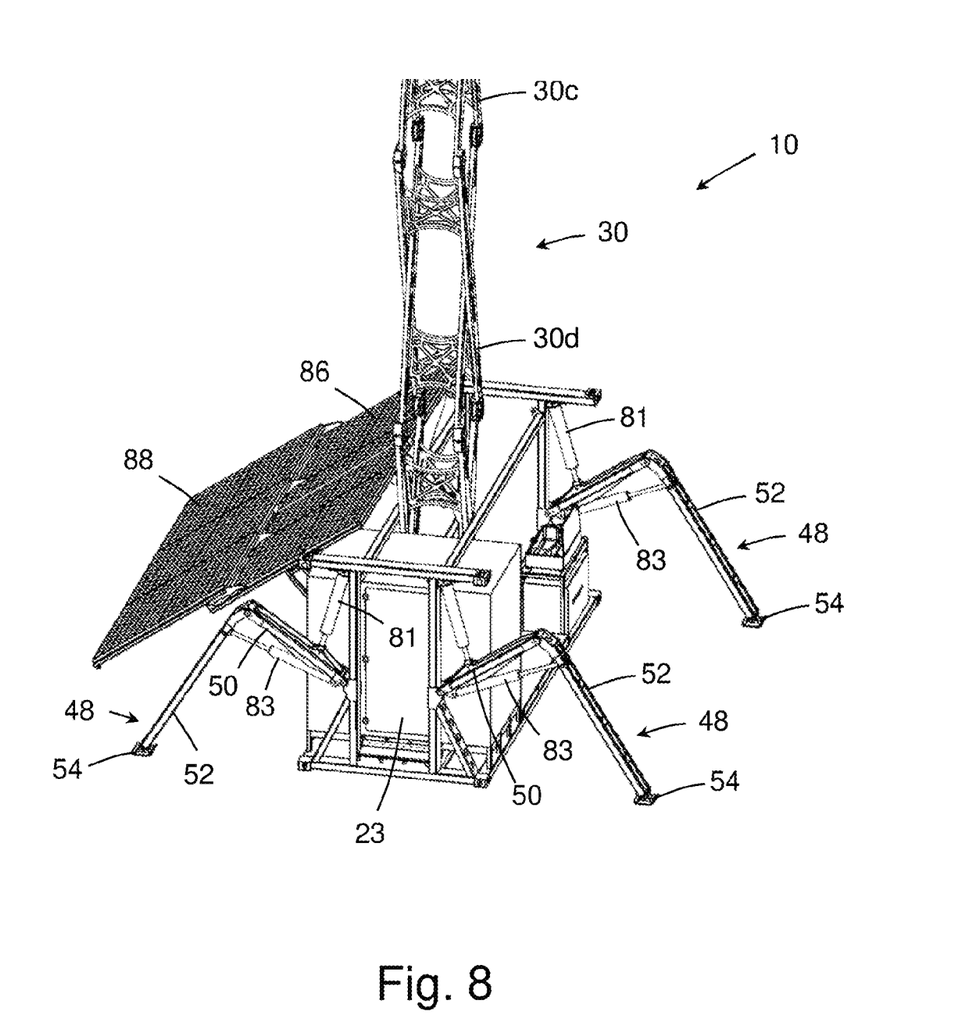
FIG. 8 is a diagrammatic perspective end view of a portion of the mobile radio station shown in FIGS. 3 to 5, showing legs, solar panels and a communications tower of the mobile radio station deployed.
Figure 9:
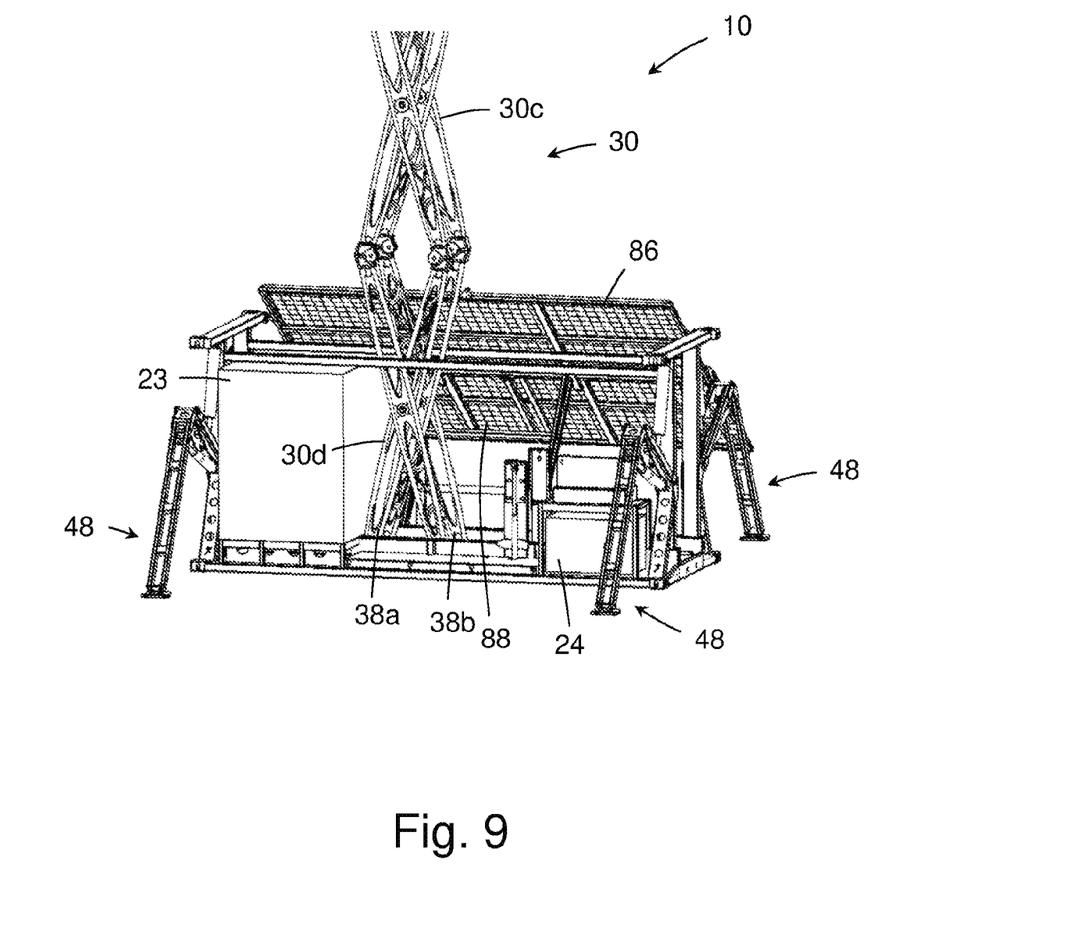
FIG. 9 is a diagrammatic perspective side view of the portion of the mobile radio station shown in FIG. 8.
Figure 10:
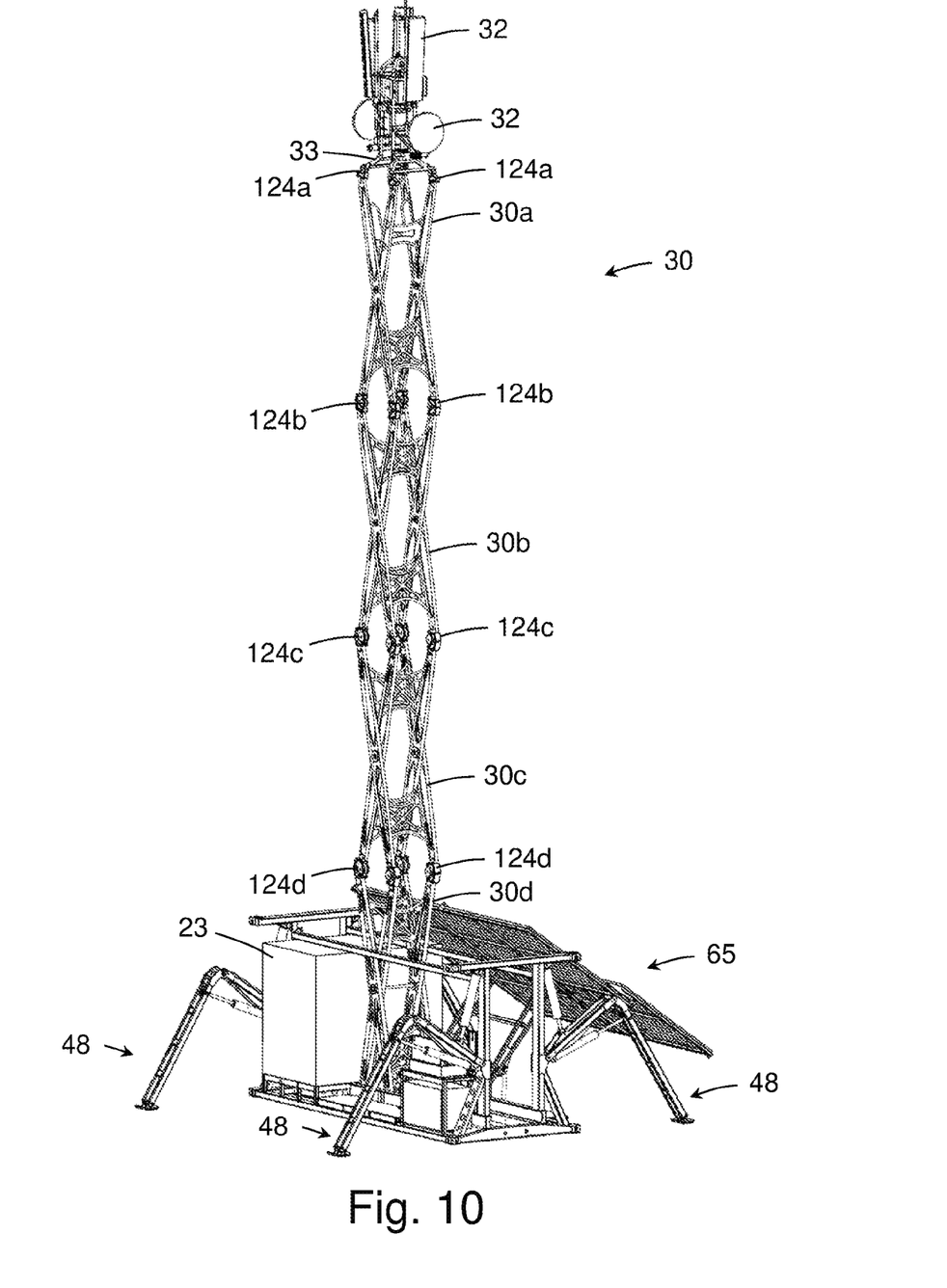
FIG. 10 is a diagrammatic perspective view of the mobile radio station shown in FIGS. 3 to 5, 8 and 9.

As shown more particularly in FIGS. 3 to 5, the frame portion houses radio station components that may include a communications system 22 arranged to facilitate and control communications using a communications tower 28 that is disposable in a stowed configuration as shown in FIGS. 3 to 5 and a deployed configuration as shown in FIGS. 8 to 10.

The radio station 10 also includes a generator 24 arranged to generate DC electricity suitable for powering operative components of the radio station 10, and an air conditioning unit, in this example a heating, ventilating and air conditioning (FIVAC) system 26 arranged to create favorable climate conditions for the operative components of the radio station 10, in particular the communications system 22.

In this example, some components of the mobile radio station 10, including the communications system 22, are housed in a shock proof equipment enclosure 23 that provides a climate controlled environment using the FIVAC system 26.

In this example, the generator 24 is capable of producing 3.5 W of DC electrical power, a primary generator and secondary backup generator are provided, and the radio station 10 arranged such that the secondary generator activates if the primary generator fails. However, it will be understood that any suitable generator is envisaged and any other redundancy arrangements may be used. In this example, the HVAC system 26 is capable of providing 5 kW of cooling power. In addition, primary HVAC and secondary HVAC systems are provided, the radio station 10 arranged such that the secondary HVAC system activates if the primary HVAC fails. However, it will be understood that any suitable air conditioning arrangement is envisaged and any other redundancy arrangements may be used.

The communications tower 28 also includes a scissor lift mechanism 30 arranged to controllably move an antenna section 31 that includes one or more communications antennae 32, in this example disposed on a platform 33, from a stowed position inside the frame portion, as shown in FIGS. 3 to 5, to a deployed position wherein the antennae 32 are disposed at an elevated position above the frame portion, as shown in FIGS. 8 to 10. The scissor lift mechanism 30 comprises multiple, in this example 2, parallel scissor lift components for additional structural integrity, stability and strength.

In this example, the scissor lift mechanism 30 is arranged to dispose the antennae 32 at a height of approximately 15 m, and is capable of operating satisfactorily in wind up to about 28 m/s. It will be appreciated that the scissor lift mechanism 30 provides a strong high capacity arrangement for elevating and carrying multiple communications antennae 32, and is expected to survive in wind up to about 45 m/s and be capable of carry a payload weight up to about 300 Kg. In a variation, the scissor lift mechanism 30 also comprises a latching or binding mechanism that mechanically locks the parallel scissor lift components together to create an integral structure.

Figure 6:
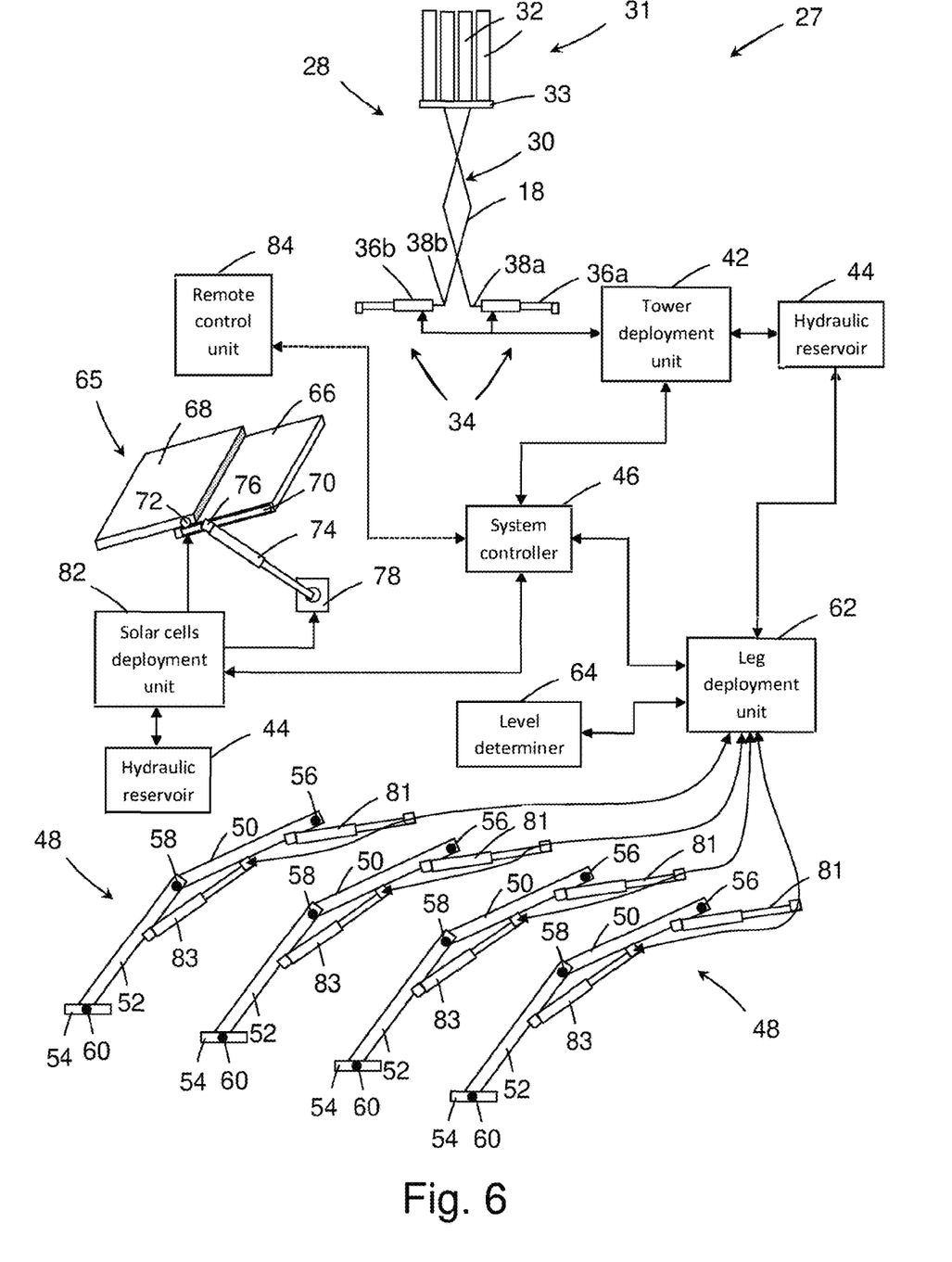
FIG. 6 is a schematic block diagram illustrating components of an example mobile radio station.

FIG. 6 shows functional components 27 of an example mobile radio station. The functional components include the communications tower 28 deployable using a tower deployment mechanism 34 that controls movement of the scissor lift mechanism 30 between the stowed configuration and the deployed configuration. The tower deployment mechanism 34 in this example includes a tower ram 36a, 36b, that may be a hydraulic ram, connected between each lower end 38a, 38b of the scissor lift mechanism 30 and an anchor point (not shown) on the frame portion, and guide channels (not shown) that facilitate controlled slidable movement of the lower ends 38a, 38b of the scissor lift mechanism 30 as the communications tower 28 is moved between stowed and deployed configurations. However, while the present embodiment uses 2 hydraulic rams to control movement of the lower ends 38a, 38b of the scissor lift mechanism 30 in the guide channels and thereby movement of the communications tower 28 between stowed and deployed configurations, it will be understood that other configurations are envisaged. For example, as shown in the embodiment shown in FIGS. 3 to 5 and 8 to 10, a single hydraulic ram may be used, with one lower end 38a of the scissor lift mechanism 30 disposed at a fixed location and the other lower end 38b of the scissor lift mechanism 30 movable in response to extension or contraction of the ram. Such an arrangement is shown in FIGS. 3 to 5 and 8 to 10. FIG. 9 shows a fixed lower end 38a and a movable lower end 38b for example engaged in a guide channel.

In addition, instead of using rams to effect slidable movement of the lower end(s) of the scissor lift mechanism 30, other movement effecting arrangements may be used. For example, a rack and pinion or mechanical lead screw arrangement may be used, with the pinion or lead screw for example driven by a suitable DC stepper motor or hydraulic motor.

In order to facilitate control of movement of the communications tower 28 between stowed and deployed configurations, the radio station 10 includes a tower deployment unit 42 that controls supply of hydraulic fluid between the rams 36a, 36b and a hydraulic reservoir 44 in response to control instructions received from a system controller 46 that in this example is in the form of a programmable logic controller (PLC) such as a Schneider M340. The mobile radio station 10 functional components also include deployable and stowable legs 48, in this example 4 legs 48 with one leg disposed adjacent each corner of the frame portion. In this example, each deployable leg 48 includes a first elongate leg portion 50 connected at a first end to the frame portion at a frame pivot connection 56 and connected at a second opposite end to a first end of a second elongate leg portion 52 at an elbow pivot connection 58. A second opposite end of the second leg portion 52 is connected to a ground engaging foot 54 at a foot pivot connection 60.

A leg deployment mechanism is used to control movement of the legs 48 between stowed configurations as shown in FIGS. 1 to 5, loading and unloading configurations, and deployed configurations as shown in FIGS. 8 to 10.

The leg deployment mechanism in this example includes 2 leg rams 81, 83 (that may be hydraulic rams) for each leg 48, a first leg ram 81 connected between the frame portion and the first leg portion 50 so as to control rotation of the leg 48 about the frame portion pivot connection 56, and a second leg ram 83 connected between the first leg portion 50 and the second leg portion 52 to control rotation of the second leg portion 52 relative to the first leg portion 50 about the elbow pivot 58.

However, while the present embodiment uses 2 hydraulic rams for each leg 48 to control movement of the legs 48 between stowed, loading/unloading and deployed configurations, it will be understood that other arrangements are envisaged.

In order to facilitate control of movement of the legs 48 between stowed, loading/unloading and deployed configurations, the radio station 10 includes a leg deployment unit 62 that controls supply of hydraulic fluid between the first and second leg rams 81, 83 and a hydraulic reservoir in response to control instructions received from the system controller 46. In this example, the same hydraulic reservoir 44 is used for both tower deployment and leg deployment, although it will be understood that separate hydraulic reservoirs may also be used.

In this embodiment, the functional components 27 also include a level determiner 64 arranged to determine the orientation of the frame portion and provide signals indicative of the orientation to the leg deployment unit 62 or the system controller 46. The orientation signals are used to control the first and second leg rams 81, 83 so that the legs 48 dispose the frame portion in a substantially level orientation when deployed. The level determiner 64 may for example include a gyroscope-based orientation sensing device or any other suitable orientation sensor.

The mobile radio station 10 functional components also include a solar cell device 65 disposable in a stowed configuration and a deployed configuration. When disposed in the stowed configuration, the solar cell device 65 serves as the top panel 16 of the frame portion. The solar cell device 65 in this example includes at least one solar panel, in this example a first solar panel 66 and a second solar panel 68. The second solar panel 68 is reciprocally movable relative to the first solar panel 66 such that the solar panels are disposable in a contracted configuration as shown in FIGS. 1 to 5 and an expanded configuration as shown in FIGS. 8 to 10. The solar panels 66, 68 may be moved between the contracted and expanded configurations in any suitable way, and in this example a rack and pinion arrangement 72, 76 is provided to effect linear movement of the second solar panel 68 relative to the first solar panel 66.

A solar cells deployment mechanism is used to control movement of the solar cell device 65 between a stowed position as shown in FIGS. 1 to 5 wherein the solar panels 66, 68 serve as the top panel 16 of the frame portion, and a deployed position as shown in FIGS. 8 to 10 wherein the solar cell device 65 moves to a position adjacent a side panel 18 and thereby enable the communications tower 28 to move from the stowed position to the deployed position, and the solar panels 66, 68 move from the contracted configuration to the expanded configuration.

The solar cells deployment mechanism in this example includes at least one solar panel ram 74, that may be a hydraulic ram, connected between the first solar panel 66 and a motor 78 that may be a DC stepper motor, the solar panel ram 74 and the motor 78 together controlling rotation and linear movement of the solar device 65 away from the frame portion. In this example, the first solar panel 66 includes a guide pin 69 that engages in a guide channel 71 on the frame portion so that the linear component of movement of the solar panels 66, 68 follows a defined path.

However, while the present embodiment uses at least one hydraulic ram 74 and a motor 78 to control movement of the solar cell device 65 between stowed and deployed configurations, it will be understood that other configurations are envisaged.

In order to facilitate control of movement of the solar cell device 65 between stowed and deployed configurations, the radio station 10 includes a solar panel deployment unit 82 that controls supply of hydraulic fluid between the solar panel ram(s) 74 and a hydraulic reservoir in response to control instructions received from the system controller 46. In this example, the same hydraulic reservoir 44 is used for tower deployment, leg deployment and solar cell deployment although it will be understood that separate hydraulic reservoirs may also be used.

In this example, the solar cell device 65 is capable of providing 4.8 kW of electrical power.

The mobile radio station 10 in this example also includes a remote control unit 84 that is usable to control functional components of the radio station 10, in particular movement of the communications tower 28, the legs 48 and the solar cell device 65, between stowed and deployed configurations. In this example, the remote control 84 is stored in a lockable compartment 86 disposed on an external face of the frame portion. The compartment 86 may be accessed in any suitable way, for example using a keypad 88. In an example, the communications tower 28 may be arranged to permit panning movement of the antennae 32 in order to align with higher order radio communications infrastructure if necessary, for example by providing a mechanism for controllably rotating the platform 33 of the communications tower 28. In an alternative arrangement, the platform 33 is not rotatable and instead each antenna 32 is provided with a mechanism to enable pan and tilt movement of each antenna 32 individually. The system controller 46 may include suitable memory and data storage to implement the required functions, including to control stowage and deployment of the communications tower 28, the legs 48 and the solar cell device 65.

Figure 7:
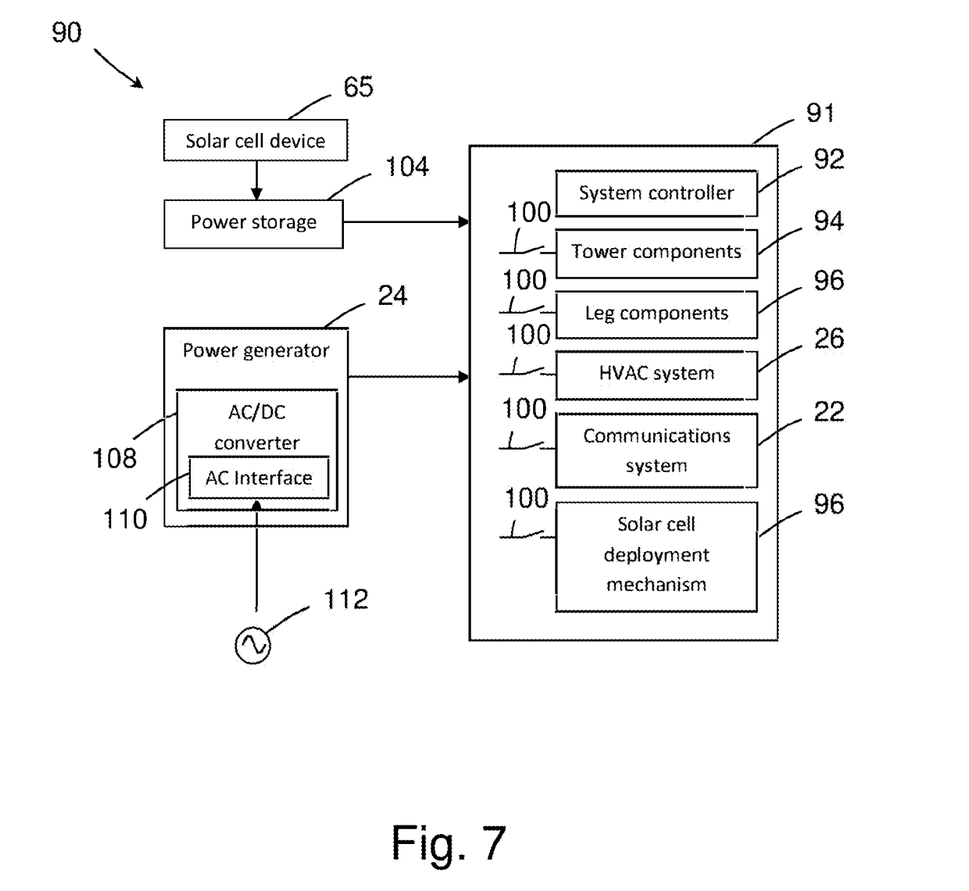
FIG. 7 is a schematic block diagram illustrating power supply and power receiving components of an example mobile radio station.

Power supply components 90 and power receiving components 91 of the mobile radio station 10 are shown more particularly in FIG. 7.

The power receiving components 91 include the system controller 46; tower components 92 that include the tower deployment unit 42; leg components 94 that include the leg deployment unit 42; solar cells components 96 that include the solar cells deployment unit 82; the HVAC system 26; the communications system 22; and any other components of the mobile radio station 10 that require electrical power.

In this example, each of the power receiving components 91 includes a power isolator 100 that may be used to selectively isolate a power receiving component 91 from electrical power, for example for replacement or maintenance purposes.

The power supply components 90 include the solar cell device 65, a power storage device 104 that may include one or more rechargeable batteries, and the power generator 24. In this example, the power generator 24 is arranged to supply DC voltage to the power receiving components 91 and for this purpose the power generator 24 includes an AC/DC converter 108. The power generator 24 also includes an AC interface 110 that facilitates receipt of mains AC power 112 directly to the AC/DC converter 108. In this example, the power storage device 104 is capable of storing 150 kWh of electrical power.

It will be understood that typically power will be supplied to the power receiving components 91 from the power storage device 104, and the power storage device will be recharged during daylight hours by the solar cell device 65. If power from the power storage device 104 is unavailable, the power generator 24 may be used. Alternatively, mains power may be provided to the AC interface 110 if this is available. In addition, since redundancy is provided for at least the generator 24 and the HVAC system 26, the radio station 10 is arranged to activate the backup generator 24 or backup HVAC system 26 should any of these components fail. An embodiment of a mobile radio station 10 in a deployed position is shown in FIGS. 8 to 10.

In this example, as shown more particularly in FIG. 9, the scissor lift mechanism 30 includes a first lower end 38a that is fixed and a second lower end 38b that is reciprocably movable. In this example, the second lower end 38b is slidably movable by engaging the second lower end 38b in an elongate guide channel. The movable second lower end 38b may be caused to move towards or away from the fixed lower end 38 to raise or lower the communications tower 28 in any suitable way, for example using a screw drive assembly driven by a suitable motor or using one or more hydraulic rams.

As shown more particularly in FIG. 10, in this example the scissor lift mechanism 30 includes 4 scissor lift stages, an uppermost first scissor lift stage 30a, a second scissor lift stage 30b, a third scissor lift stage 30c and a lowermost fourth scissor lift stage 30d. However, it will be understood that any number of scissor lift stages may be provided.

Disposed between the antenna section 31 and the first scissor lift stage 30a are first interstage joints 124a. Disposed between the first scissor lift stage 30a and the second scissor lift stage 30b are second interstage joints 124b. Disposed between the second scissor lift stage 30b and the third scissor lift stage 30c are third interstage joints 124c. Disposed between the third scissor lift stage 30c and the fourth scissor lift stage 30d are fourth interstage joints 124d.

Each interstage joint 124a, 124b, 124c, 124d is arranged to facilitate low friction deployment of the communications tower 28 whilst providing a stable rigid tower structure when deployed.

Figure 11:
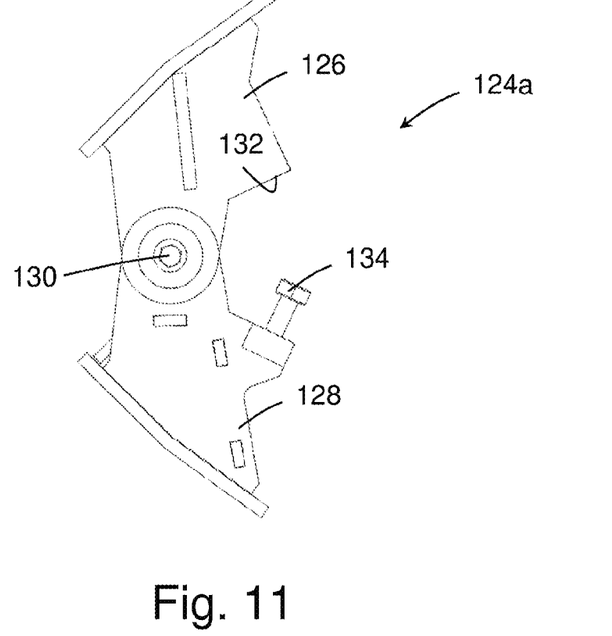
FIG. 11 is a diagrammatic view of an interstage joint of an embodiment of a model mobile radio station, with the interstage joint shown in a disengaged position.
Figure 12:
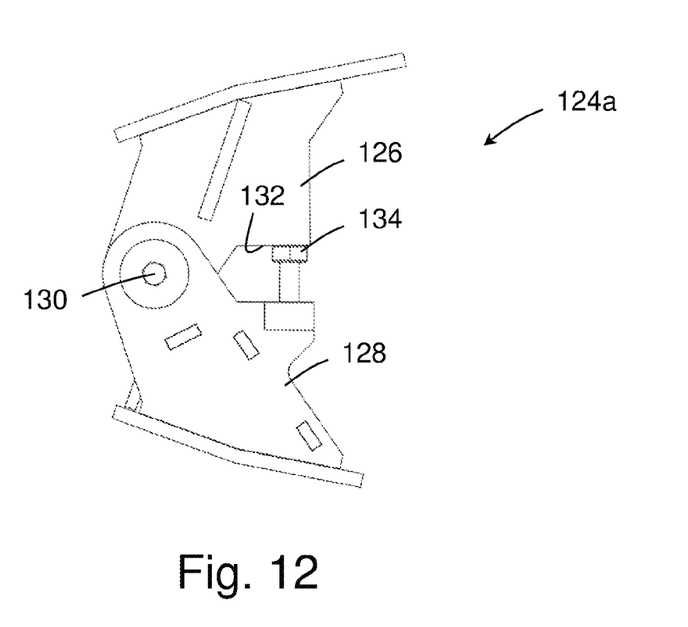
FIG. 12 is a diagrammatic view of the interstage joint shown in FIG. 11, with the interstage joint shown in an engaged position.

An example interstage joint 124a is shown more particularly in FIGS. 11 and 12. The interstage joint 124a includes a first joint member 126, a second joint member 128 and a joint pivot connection 130 that facilitates relative angular movement of the first and second joint members 126, 128 towards and away from each other.

The first joint member 126 includes a load surface 132 and the second joint member 128 includes a load member 134, although it will be understood that in an alternative arrangement, the first joint member 126 may include the load member 134 and the second joint member 128 may include the load surface 132.

In the present example, in order to facilitate ease of deployment of the communications tower 28, the joint pivot connections 130 are configured so as to provide relatively low friction and thereby relatively low resistance to rotation of the first and second joint members 126, 128 relative to each other. This may be achieved by providing a relatively large clearance between a pivot pin of the pivot connection 130 and the associated apertures of the first and second joint members 126, 128 that receive the pivot pin.

When the communications tower 28 is disposed in the stowed configuration or in a position between the stowed configuration and the deployed configuration, the interstage joint 124a is disposed in a disengaged position, as shown in FIG. 11. In the disengaged position, the load member 134 does not contact the load surface 132 and therefore loads resulting from the weight of components above the interstage joint 124a and loads resulting from environmental conditions are resolved at the joint pivot connection 130. It will be appreciated that since the joint pivot connections 130 are configured so as to provide relatively low friction to rotation of the first and second joint members 126,

128, the communications tower 28 has relatively low rigidity when stowed and when disposed between the stowed configuration and the deployed configuration. During deployment, as the movable pivot second lower end 38b moves towards the fixed first lower end 38a and the communications tower 28 moves towards the deployed configuration, the load member 134 will eventually contact the load surface 132. Further movement of the second lower end 38b towards the first lower end 38a will cause the point of contact between the first and second joint members 126, 128 to act as a pivot connection and the first and second joint members 126, 128 to move slightly away from each other at the joint pivot connection 130. This causes the rigidity of the interstage joint 124a to significantly increase and the interstage joint 124a to be effectively disposed in a locked position. In this way, as each interstage joint 124a, 124b, 124c, 124d is caused to pivot slightly about the point of initial contact, a pre-load (pre-stress) condition is created at each interstage joint as the interstage joint reaches the locked position which collectively significantly enhances the rigidity of the communications tower 28 when the communications tower 28 is in the deployed configuration. In the present example, the communications tower 28 is arranged such that the first, second, third and fourth interstage joints 124a, 124b, 124c, 124d reach a locked position at different stages of the communications tower deployment process. For example, the communications tower 28 may be arranged such that the first, second, third and fourth interstage joints 124a, 124b, 124c, 124d reach a lock position consecutively in a cascading manner such that the first scissor lift stage 130a locks first and the fourth scissor lift stage 130d locks last. In this way, pre-stress is more evenly applied across the communications tower 28. The interstage joints 124a, 124b, 124c, 124d may be caused to reach the locked position at different stages of the communications tower deployment process by configuring the interstage joints 124a, 124b, 124c, 124d in any suitable way. For example, the shape of the respective first and second joint members 126, 128 of the interstage joints 124a, 124b, 124c, 124d may be slightly different, or the length of the respective load members 134 of the interstage joints 124a, 124b, 124c, 124d may be slightly different.

During use, the mobile radio station 10 may be operated as follows. In order to deploy the mobile radio station 10 to a desired location, such as a remote mine site, a suitable truck (not shown) capable of carrying the frame portion is used. In order to prepare the radio station 10 for loading onto the truck, an operator first accesses the remote control unit 84 by entering an unlock code into the keypad 88. Using the remote control 84, the operator activates the leg deployment unit 62 to cause the legs 48 to move outward and downward from the stowed configuration to a loading/unloading configuration, and thereby lift the frame portion above the ground by a distance sufficient for a bed of the truck to be received underneath the frame portion. After positioning the truck bed in this way, the operator controls the leg deployment unit 62 to cause the legs 48 to move back to the stowed position. After securing the frame portion relative to the truck, the truck then transports the frame portion to the desired use location.

When the truck has arrived at the desired use location, using the remote control unit 84, the operator controls the leg deployment unit 62 to cause the legs 48 to move back to the loading/unloading configuration and thereby lift the frame portion above the truck bed by a distance sufficient for the frame portion to separate from the truck. The truck is then driven away from underneath the frame portion, and the operator controls the legs 48 to cause the frame portion to move towards the ground. The operator then uses the remote control unit 84 to cause the legs 48 to move to the deployed configuration wherein the legs 48 fully extend, in this example to a horizontal distance of about 2.4 m from the frame portion. In addition, the leg deployment unit 62 uses the level determiner 64 to ensure that the orientation of the frame portion when deployed is substantially level.

In the present embodiment, the radio station 10 is also arranged to assess the weight bearing capacity of the ground prior to deployment of the solar call device 65. The operator then uses the remote control unit 84 to activate deployment of the panels 66, 68 which causes the solar cell device 65 to move from the stowed configuration to the deployed configuration, including movement of the second solar panel 68 to move from the contracted configuration to the expanded configuration. The operator then uses the remote control unit 84 to activate deployment of the communications tower 28 which causes lower ends 38a, 38b of the lowermost fourth scissor lift stage 30d to move towards each other and the antennae 32 to move upwards, in this example to a selected height of up to about 15 m. By virtue of the interstage joints 124a, 124b, 124c, 124d, the scissor lift stages 30a, 30b, 30c, 30d lock in turn from the uppermost first scissor lift stage 30a to the lowermost fourth scissor lift stage 30d.

It will be understood that the present mobile radio station is rapidly deployable and provides very high capacity radio communications that has good reliability. Typically, the mobile radio station is deployable within 30 minutes of arrival at the use destination.

In the claims which follow and in the preceding description, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments.

Modifications and variations as would be apparent to a skilled addressee are deemed to be within the scope of the present disclosure.

The preferred embodiments of the disclosure have been described above to explain the principles of the present disclosure and its practical application to thereby enable others skilled in the art to utilize the present disclosure. However, as various modifications could be made in the constructions and methods herein described and illustrated without departing from the scope of the present disclosure, it is intended that all matter contained in the foregoing description or shown in the accompanying drawings, including all materials expressly incorporated by reference herein, shall be interpreted as illustrative rather than limiting. Thus, the breadth and scope of the present disclosure should not be limited by the above-described exemplary embodiment but should be defined only in accordance with the following claims appended hereto and their equivalents.

The invention claimed is:

1. A mobile radio station comprising:
a frame portion;
a communications tower having at least one communications antenna and a scissor lift mechanism usable to dispose the communications tower in a stowed configuration wherein the communications tower is disposed in the frame portion, and a deployed configuration wherein the communications tower extends out of the frame portion and disposes the at least one antenna upwardly of the frame portion; and a tower deployment mechanism usable to control movement of the scissor lift mechanism and thereby movement of the communications tower between the stowed configuration and the deployed configuration;
the scissor lift mechanism including at least two scissor lift stages movably connected together using a plurality of interstage joints, each interstage joint including a first joint member having a first contact portion, a second joint member having a second contact portion and a joint pivot connection that facilitates relative angular movement between the first and second joint members;
the first joint member connected to a first scissor lift stage and the second joint member connected to an adjacent second scissor lift stage such that as the communications tower moves from the stowed configuration to the deployed configuration, the first joint member rotates relative to the second joint member about the joint pivot connection until the first contact portion contacts the second contact portion at a point of contact; and
wherein further rotational movement of the first joint member relative to the second joint member about the joint pivot connection causes pivotal movement of the first joint member relative to the second joint member about the point of contact and movement of the interstage joint to a rigid configuration wherein rigidity of the interstage joint is increased.

2. A mobile radio station as claimed in claim 1, wherein the scissor lift mechanism comprises a plurality of aligned scissor lift components.

3. A mobile radio station as claimed in claim 1, wherein the scissor lift mechanism is arranged to cause the interstage joint joints disposed between different scissor lift stages to move to the rigid configuration in sequence.

4. A mobile radio station as claimed in claim 3, wherein the sequence is such that the interstage joint disposed relatively remote from a lowermost end of the communications tower move to the rigid configuration before the interstage joint disposed relatively adjacent the lowermost end of the communications tower.

5. A mobile radio station as claimed in claim 1, wherein the communications tower is disposable in a partially deployed configuration wherein the communications tower extends out of the frame portion and disposes the at least one antenna upwardly of the frame portion at a height less than the height of the at least one antenna when the communications tower is in the deployed configuration.

6. A mobile radio station as claimed in claim 1, wherein the scissor lift mechanism comprises at least 2 lower end portions remote from the at least one antenna, and the tower deployment mechanism is arranged to control movement of at least one end portion towards and away from the other end portion and thereby movement of the scissor lift mechanism between a stowed configuration and deployed configuration.

7. A mobile radio station as claimed in claim 6, wherein the tower deployment mechanism includes at least one tower ram connected between a lower end portion and the frame portion, the at least one tower ram facilitating controlled slidable movement of the at least one lower end portion and thereby movement of the scissor lift mechanism between a stowed configuration and deployed configuration.

8. A mobile radio station as claimed in claim 1, comprising:
a plurality of legs, each leg disposable in a stowed configuration wherein the leg is disposed adjacent the frame portion and a deployed configuration wherein a free end of the leg is disposed remotely relative to the frame portion and in contact with the ground; and
a leg deployment mechanism to control movement of the legs between the stowed configuration and the deployed configuration.

9. A mobile radio station as claimed in claim 8, comprising a level determiner arranged to determine the orientation of the frame portion and produce signals indicative of the orientation of the frame portion, the orientation signals used to control the leg deployment mechanism so that the legs dispose the frame portion in a substantially level orientation when deployed.

10. A mobile radio station as claimed in claim 8, wherein the leg deployment mechanism is arranged to control movement of the legs to and from a loading/unloading configuration wherein the frame portion is raised by the legs relative to the ground such that a bed of a truck is disposable under or removable from under the frame portion.

11. A mobile radio station as claimed in claim 1, comprising a solar cell device disposable in a stowed configuration wherein the solar cell device serves as a top panel of the frame portion and the communications tower cannot move from the stowed configuration to the deployed configuration, and a deployed configuration wherein the solar cell device is disposed adjacent a side of the frame portion and the communications tower is able to move from the stowed configuration to the deployed configuration.

12. A mobile radio station as claimed in claim 11, comprising a solar cell device deployment mechanism arranged to control movement of the solar cell device between the stowed configuration n and the deployed configuration.

13. A mobile radio station as claimed in claim 11, wherein the solar cell device includes a first solar panel and a second solar panel, the second solar panel reciprocally movable relative to the first solar panel such that the solar panels are disposable in a contracted configuration and an expanded configuration.

14. A mobile radio station as claimed in claim 1, comprising a remote control unit usable to control at least one component of the mobile radio station, and the frame portion includes an externally disposed lockable compartment for storing the remote control.

15. A mobile radio station as claimed in claim 1, comprising a communications system arranged to facilitate and control communications using the communications tower, the communications system disposed in the frame portion.

16. A mobile radio station as claimed in claim 1, comprising at least one generator arranged to generate electrical power for components of the mobile radio station, the at least one generator disposed in the frame portion.

17. A mobile radio station as claimed in claim 16, wherein each generator is arranged to produce DC electricity, and each generator includes an AC interface arranged to receive external AC electricity and convert the received AC electricity to DC electricity for use by components of the mobile radio station.

18. A mobile radio station as claimed in claim 1, comprising a power storage device and at least one generator arranged to generate electrical power for components of the mobile radio station, the at least one generator disposed in the frame portion, wherein the mobile radio station is arranged to supply electrical power to components of the mobile radio station from the power storage device, and to activate a generator to supply electrical power to the components of the mobile radio station if the power storage device has insufficient electrical power is available.

19. A mobile radio station as claimed in claim 1, comprising at least one air conditioning system, the at least one air conditioning system disposed in the frame portion.

20. A mobile radio station as claimed in claim 1, wherein the frame portion forms part of a container.

* * * * *